(12) United States Patent
Dwyer et al.

(10) Patent No.: US 11,601,345 B2
(45) Date of Patent: *Mar. 7, 2023

(54) NETWORK SERVICE ACTIVATION SYSTEM

(71) Applicant: Level 3 Communications, LLC, Broomfield, CO (US)

(72) Inventors: James C. Dwyer, Spring, TX (US); Michael L. Nyhus, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/347,250

(22) Filed: Jun. 14, 2021

(65) Prior Publication Data

US 2021/0306234 A1    Sep. 30, 2021

Related U.S. Application Data

(63) Continuation of application No. 16/905,356, filed on Jun. 18, 2020, now Pat. No. 11,044,172.
(Continued)

(51) Int. Cl.
*H04L 12/24* (2006.01)
*H04L 12/26* (2006.01)
(Continued)

(52) U.S. Cl.
CPC ...... *H04L 41/5048* (2013.01); *H04L 43/0805* (2013.01)

(58) Field of Classification Search
CPC . H04L 41/0895; H04L 43/0805; H04L 41/40; H04L 41/5048; H04L 43/0817;
(Continued)

(56) References Cited

U.S. PATENT DOCUMENTS 10,708,380 B2 * 7/2020 Busayarat ........... H04L 41/5054
10,892,937 B1 * 1/2021 Mukhopadhyaya .. H04L 67/025
(Continued)

OTHER PUBLICATIONS

International Search Report and Written Opinion of the International Searching Authority, dated Nov. 18, 2020, Int'l Appl. No. PCT/US20/047140, Int'l Filing Date Aug. 20, 2020; 14 pgs.

*Primary Examiner* — Abdullahi E Salad

(57) ABSTRACT

Aspects of the present disclosure involve systems and methods for a service activation system in a telecommunications network that utilizes one or more generic container files for building the configuration file to instantiate the service on the network. A request for service from a network may be received from an order entry system that includes specific information about the requested service. A collection of generic configuration files may be selected based on the information included in the service order and arranged to build a configuration file to be executed on the network. The service activation system may also include a component or group of components to verify a received service order and alter the service order with default information or data where applicable. The configuration file may also be executed on the network through one or more drivers communicating with the affected devices to configure the one or more network devices.

18 Claims, 6 Drawing Sheets

Related U.S. Application Data

(60) Provisional application No. 62/905,954, filed on Sep. 25, 2019.

(51) Int. Cl.
*H04L 41/5041* (2022.01)
*H04L 43/0805* (2022.01)

(58) Field of Classification Search
CPC ............. H04L 41/0843; H04L 41/5012; H04L 41/5051; H04L 41/0806
See application file for complete search history.

(56) References Cited

U.S. PATENT DOCUMENTS

| | | | |
|---|---|---|---|
| 2007/0287473 A1* | 12/2007 | Dupray | H04W 4/029 |
| | | | 455/456.1 |
| 2014/0012965 A1* | 1/2014 | Ding | H04L 41/5061 |
| | | | 709/221 |
| 2016/0147777 A1* | 5/2016 | Gade | G06F 16/148 |
| | | | 718/104 |
| 2016/0337473 A1 | 11/2016 | Rao | |
| 2017/0141970 A1* | 5/2017 | Adkins, III | H04L 41/5054 |
| 2018/0139106 A1* | 5/2018 | Senarath | H04L 41/145 |
| 2019/0245743 A1* | 8/2019 | A | H04L 41/0823 |
| 2020/0084107 A1* | 3/2020 | Li | H04L 41/5054 |
| 2021/0092028 A1 | 3/2021 | Dwyer | |

* cited by examiner

NETWORK SERVICE ACTIVATION SYSTEM

TECHNICAL FIELD

Aspects of the present disclosure generally relate to a service activation system for a network; and more particularly, to a system for improving device activation and configuration in a network by receiving a service request, obtaining data from the service request, and building a configuration file from a plurality of generic container files for configuring a service based on the information of the service request.

BACKGROUND

A service provider in the telecommunications industry faces unique challenges with respect to providing the required technical infrastructure to fulfill services for its customers. The service provider must process orders from clients for various possible services, where each order and each possible service may require unique configurations of numerous devices needed to fulfill the service. However, conventional order provisioning systems often require customers or the provisioning systems to have knowledge of the network configuration when requesting services. For example, a customer to a network may request a VPN connection in a network that may include a variety of devices providing aspects of the requested service. However, the network information available to the provisioning system may be out of date such that availability of particular devices or interfaces of the network may no longer be available to provide the services. Thus, when a requested service order is submitted to the provisioning system, many conventional systems generate errors and/or require new orders to be submitted.

Further, conventional order provisioning systems may not address compatibility issues. For example, a service provider may receive orders from different types of order entry systems, which may require collection of different types of data to fulfill the orders. Further still, different devices may need to be configured to provide a service that may require different types or forms of configuration information. A conventional system may often require manual intervention to configure different types of devices or otherwise access information needed for different device configurations.

It is with these observations in mind, among other, that aspects of the present disclosure were conceived.

SUMMARY

One aspect of the present disclosure relates to a method for provisioning a network service. The method may include the operations of accessing, utilizing a processor of a network service activation system, a service request model associated with a network service, the request model including information associated with the network service and generating, based on the information of the service request model, a data stack associated with the network service, the data stack comprising data extracted from the service request model. The method may also include the operations of selecting, based on the data stack, a plurality of container files comprising configuration instructions for configuring a network device to provide the network service and causing the execution of the configuration instructions on the network device to configure the network device according to the container files to provide the network service.

Another aspect of the present disclosure relates to a system for provisioning a network service. The system may include at least one communication port for receiving, from an order entry system, a service request model associated with a network connection design to provide an intended network service to a user of a telecommunications network, a processing device, and a computer-readable medium connected to the processing device configured to store instructions. When executed, the instructions may cause the processing device to perform the operations of generating, based on information included in the service request model, a data stack comprising one or more portions of the information in the service request model and applying a network configuration template for configuring a network to provide the network service, the network configuration template comprising a plurality of ordered generic container files selected for the network configuration template based on the data stack, wherein one or more of the generic container files comprise a network service precheck routine, a network device precheck routine, and a plurality of configuration instructions populated from the data stack for configuring a network device.

Yet another aspect of the present disclosure relates to a networking device for activating services on a telecommunications network. The network device may include a processing device and a computer-readable medium connected to the processing device configured to store instructions. Those instructions may cause the processing device to perform the operations of obtaining a service request model associated with a network service, the request model including information associated with the network service, extracting information of the service request model to generate a data stack associated with the network service, the data stack comprising the extracted information, selecting, based on the data stack, a plurality of container files comprising configuration instructions for configuring a network device to provide the network service, and communicating with the network device to configure the network device according to the container files to provide the network service.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
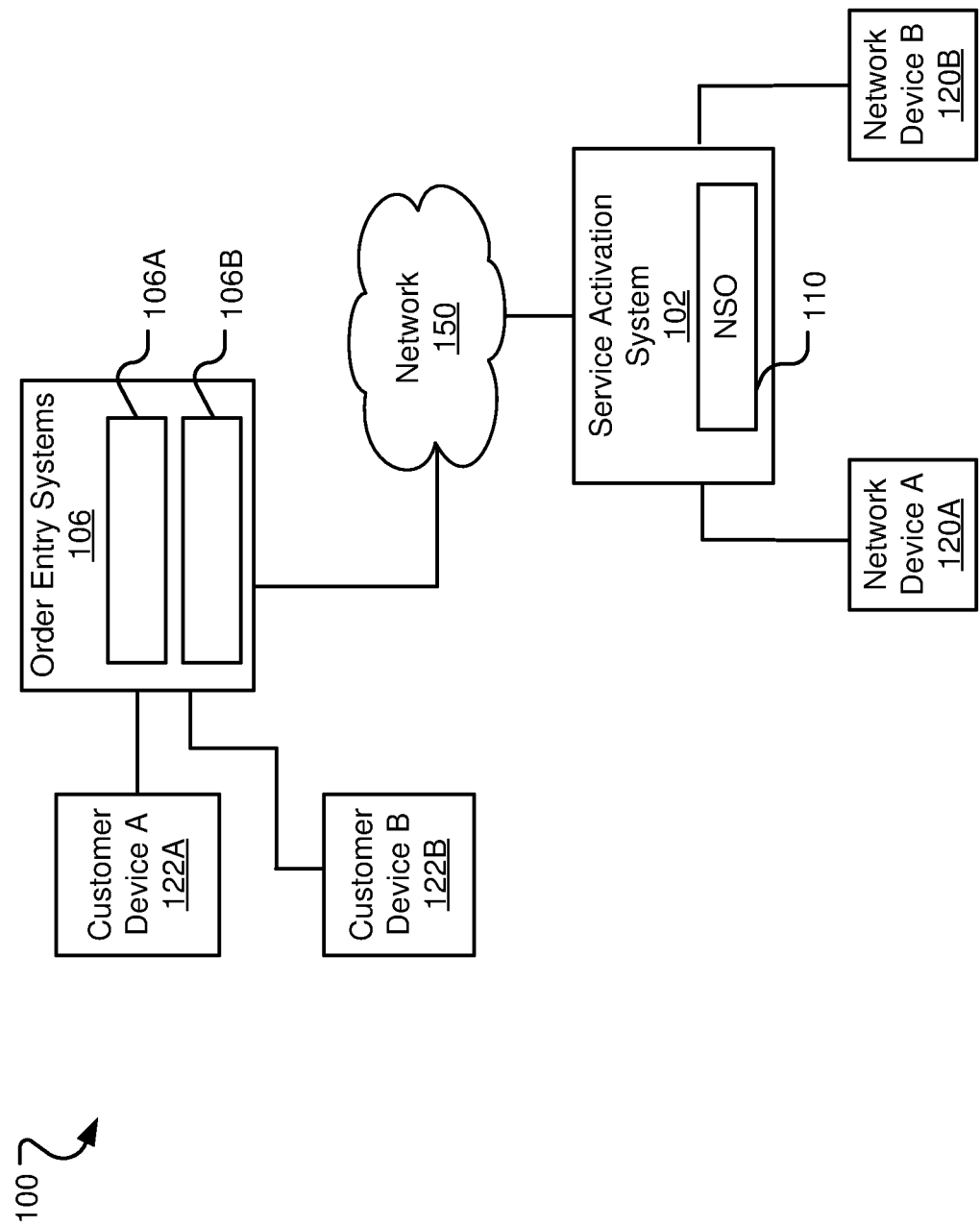
FIG. 1 illustrates an exemplary block diagram of a service activation system for a network utilizing container files, according to aspects of the present disclosure.

Aspects of the present disclosure involve systems and methods for a service activation system in a telecommunications network that utilizes one or more generic container files for building the configuration file to instantiate the service on the network. In general, a request for service from a network may be received from an order entry system that includes specific information about the requested service, such as a service type or product, a network device type on which the service is requested to be added, customer information associated with the requested service, an identification of a network from which the service is requested, etc. In one instance, a customer to a network or a network administrator may access the order entry system to provide the service request information. In previous instances, the order entry system may verify the service order and generate a network configuration file with instructions to the network on instantiating the requested service on the network. However, the configuration file generated by the order entry system may be based on outdated network information and may require each service order system associated with the network to maintain the various processes or instructions to configure the network according to the service order. This approach frontloads the processing requirement for service instantiation in the order systems and is vulnerable to mistakes in network configuration.

Another approach to service instantiation in the network may utilize a collection or database of generic configuration files (referred to herein as "container files") that may be selected based on the information included in the service order and arranged to build the configuration file to be executed on the network. Similar configuration actions for providing similar services may be combined into a generic container file such that a configuration file built using the container files may be simplified. For example, a service request for creating a bridge group for a layer 2 connection and a layer 3 connection in the network may include many similar configuration instructions such that a single container file for creating a bridge group may be generated and stored. Upon receiving a service request for a bridge group on either type of connection, the service activation system may select the bridge group configuration container file and populate the container file with data from the service order. In this manner, the service activation system may reduce the number of configuration procedures stored to provide requested services for the network. Further, upstream order systems no longer need to interact with or have knowledge of the current network configuration to build a service request as the generation of the service configuration file is executed by the service activation system. This may simplify the process of instantiating a service on the network and reduce the potential for erroneous configurations of the network, improving the security and operation of the network.

In one instance, the service activation system may include a component or group of components to verify a received service order and alter the service order with default information or data where applicable. A decomposition component may comb the service order and extract or otherwise obtain a data stack from the service order, including a type of requested service, a device or devices upon which the service is requested, and a general role associated with the requested service. The service activation system may also include a component builder that compares the data stack obtained from the service order to a collection or database of container files to determine which container files are to be included in the configuration file for the requested service. A collator may then combine, alter, extract, or otherwise configure the selected container files into a configuration file to be executed on one or more networks to provide the requested service from the networks, including one or more prechecks on the network devices included in providing the service. The configuration file may also be executed on the network through one or more drivers communicating with the affected devices, the configuration file configuring the one or more network devices. In this manner, the configuration file may be generated from a database of container files that include generic instructions for instantiating the services within the network.

FIG. 1 illustrates a system 100 of a telecommunications service provider for fulfilling an order for a telecommunications service, in accordance with various embodiments discussed herein. The system 100 comprises a plurality of order entry systems 106 or requestor modules. The order entry systems 106A-106B may receive orders for telecommunications services from customer device 122A, customer device 122B, or from administrators of the telecommunications network. The customer computing device 122A, 122B may be used to submit the order for the telecommunications service to the order entry systems 106. The customer computing device 122A may comprise at least one computing system and may comprise a server, desktop computer, smartphone, or other device capable of accessing the order entry systems 106 and submitting an order for a telecommunications service.

In some instances, the order entry system 106 may analyze the received order for the telecommunications service and generate a service request model. The service request model may include information or data associated with the service request, such as a service type, a product name or identifier associated with the service, one or more device identifiers on which the service is requested, routing protocols of the requested service, and the like. In some instances, the creation of the service model may include input from a network engineer. The generation of the service model based on the received request may include analyzing one or more fields of the service order and populating a standardized service model with the information from the order.

The system 100 may further include a service activation system 102. The service activation system 102 may receive the service order from the order entry system(s) 106 over network 150 and may generate or build a network configuration file for configuring devices of a network. As such, the service activation system 102 may include a Network Service Orchestrator (NSO) system 110 in addition to other components. In general, the NSO 110 is a configuration system that activates and configures devices as set out in a configuration file generated by the service activation system 102 or any other type of connection design. The service activation system 102 may be connected to one or more of the network devices 120A or 120B to provision the ordered telecommunications service. Each of the network devices 120A or 120B may comprise a network interface device such as router, a switch, a session border controller (SBC), a gateway, a gateway controller, or the like.

Figure 2:
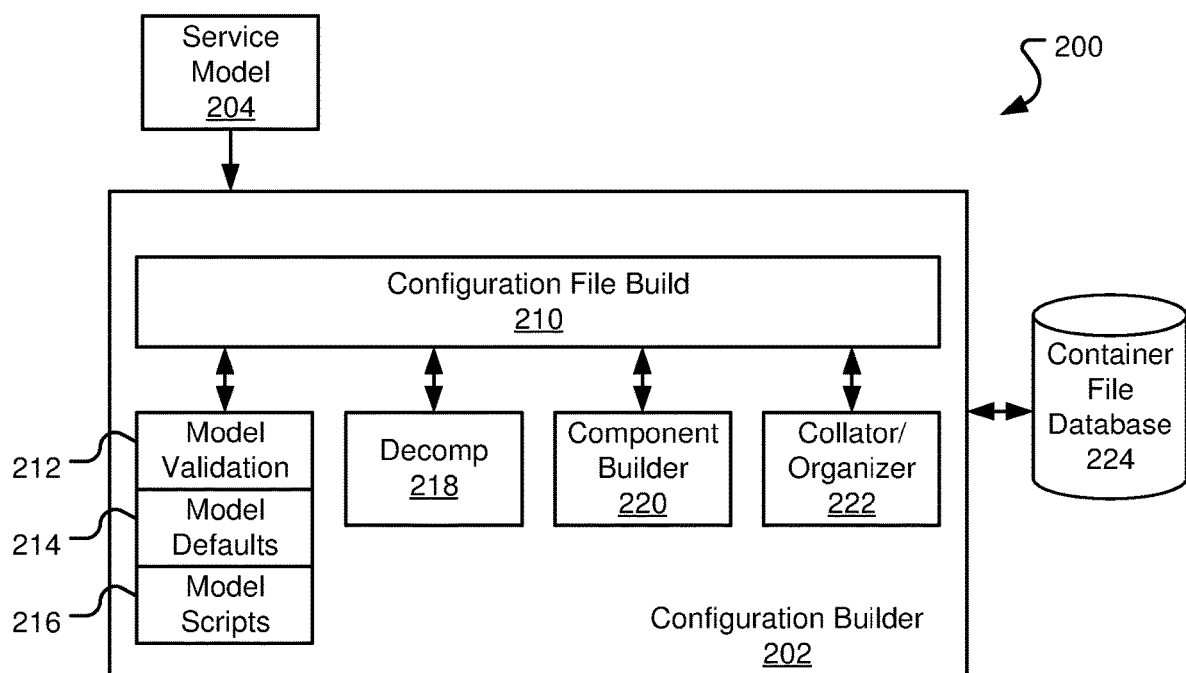
FIG. 2 illustrates an exemplary block diagram of a configuration builder of the service activation system of the network, according to aspects of the present disclosure.

As mentioned, the service activation system 102 may receive service order models from the order entry systems 106 based on information provided by a customer device 122A, 122B or network engineer. FIG. 2 illustrates an exemplary block diagram of a configuration builder of the service activation system 102 of the network, according to aspects of the present disclosure. The configuration builder 202 may be included in the service activation system 102 of FIG. 1. As such, the configuration builder 202 may receive a service model 204 that includes information and data associated with a network service request provided from a service order system 106. As mentioned above, the service model 204 may include a service type, a product name or identifier associated with the service, one or more device identifiers on which the service is requested, routing protocols of the requested service, and the like. The service model 204 may be organized in a manner to facilitate extraction of information or data from the model 204. For example, the service model 204 may include a plurality of fields associated with a network service order and values associated with those fields, including alphanumeric values and/or numeric values. In one particular example, the service model 204 may be based on a request for a VPN service of a network and may include a VPN product name, a role identifier associated with a VPN service, one or more Internet Protocol (IP) addresses for inclusion in the VPN service, one or more network device identifiers for which the VPN service is associated, and the like. In some instances, the service model 204 may be provided by a customer device 122A, 122B in communication with the service order system 106 or may be generated by the service order system 106 based on information provided to the system 106 from a customer or network engineer.

Upon receiving the service model 204, the configuration builder 202 may execute a process to build a configuration file 210 for instantiating the service on a network or networks. For example, the configuration builder 202 may include a service model validator 212 that analyzes the service model 204 and returns a valid signal or error signal based on the analysis. For example, if a value for a field of the service model 204 is missing or does not have a recognized form, the model validator 212 may return an error to the service order system 106 of an invalid service model. In some instances, the configuration builder 202 may provide one or more values to one or more fields of the service model 204. For example, the configuration builder 202 may store one or more model default values 214 that may be inserted into the service model 204 in place of missing or improper data values. The configuration builder 202 may also include one or more scripts 216 that may be executed by the configuration builder 202 to alter or update the service model 204 with default or other values. Upon updating, the service model 204 may be re-validated by the model validator 212. The service model 204 validation process may repeat until a valid service model 204 is obtained.

The configuration file build process 210 may also include a decomposition component 218 that decomposes the service model 204 to generate a data stack of service order information. For example, the decomposition component 218 may extract one or more values from the fields of the service model 204 and arrange the extracted values in a data stack for use in generating a configuration file. In some instances, the decomposition component 218 may generate one or more entries in the data stack associated with service order based on information included in the service order. For example, the servicer model 204 may include a range of IP addresses associated with the service. The decomposition component 218 may, in this example, generate a plurality of IP address ranges from the range included in the service model 204 corresponding to different networks on which the service will be instantiated. In another example, the decomposition component 218 may import a service role value onto the data stack based on the product identifier included in the service model 204. Further, the procedures executed by the configuration builder 202 to decomposite the service model 204 may be based on the information included in the service model 204, such that the inclusion or exclusion of certain fields and/or certain values within fields of the service model 204 may cause the decomposition component 218 to perform various decomposition procedures to extract the data for the data stack. Regardless of the procedures used, the decomposition component 218 generates a data stack associated with the service model 204 for use in building a configuration file to instantiate the service on one or more networks.

The configuration builder 202 may also include a component builder 220 to identify and obtain one or more container files from a container file database 224 based on the data or information included in the data stack. For example, the data stack may include a service role of "bridge group" on an existing virtual private network. The component builder 220 may identify one or more container files from the container file database 224 associated with a bridge group role, including container files for instantiating a bridge group on a VPN. In general, each data or information entry of the data stack may be compared to each container file to determine if the container file is to be included in the configuration file build. Thus, each container file included in the database 224 may be associated with some data or information entry to determine when that container file is selected for a configuration file. Each container file may therefore include a list of such data entries. Some container files may include multiple data entries, such as "bridge group", "VPN", "network A", etc. and may include processes or logic that determines a combination of the data entries that trigger inclusion of the container file in the configuration file. The process for selecting container files from the database 224 by the component builder 220 is described in more detail below with reference to the method 300 of FIG. 3.

The configuration file build process 210 may also include a collator/organizer 222 to organize and collate the container files identified by the component builder 220. In one instance, the container files may be organized based on a sequence of execution on one or more networks to provide the service. For example, a VPN service may include configuring network devices with particular VPN interfaces before establishing a connection between the devices. Thus, the container files for configuring the interfaces on the network devices may be ordered before configuration of connections between the devices. The collator/organizer 222 may also extract portions of the selected container files for ordering within the configuration file. For example, one or more of the selected container files may include service prechecks and/or device prechecks that are to be executed before execution of configuration instructions on the network. These precheck routines may be extracted from the container files and ordered with the container files by collator/organizer 222. Further, as the precheck routines are often executed before configurations, the precheck routines may be ordered before configuration routines in the configuration file for the requested service.

Figure 3:
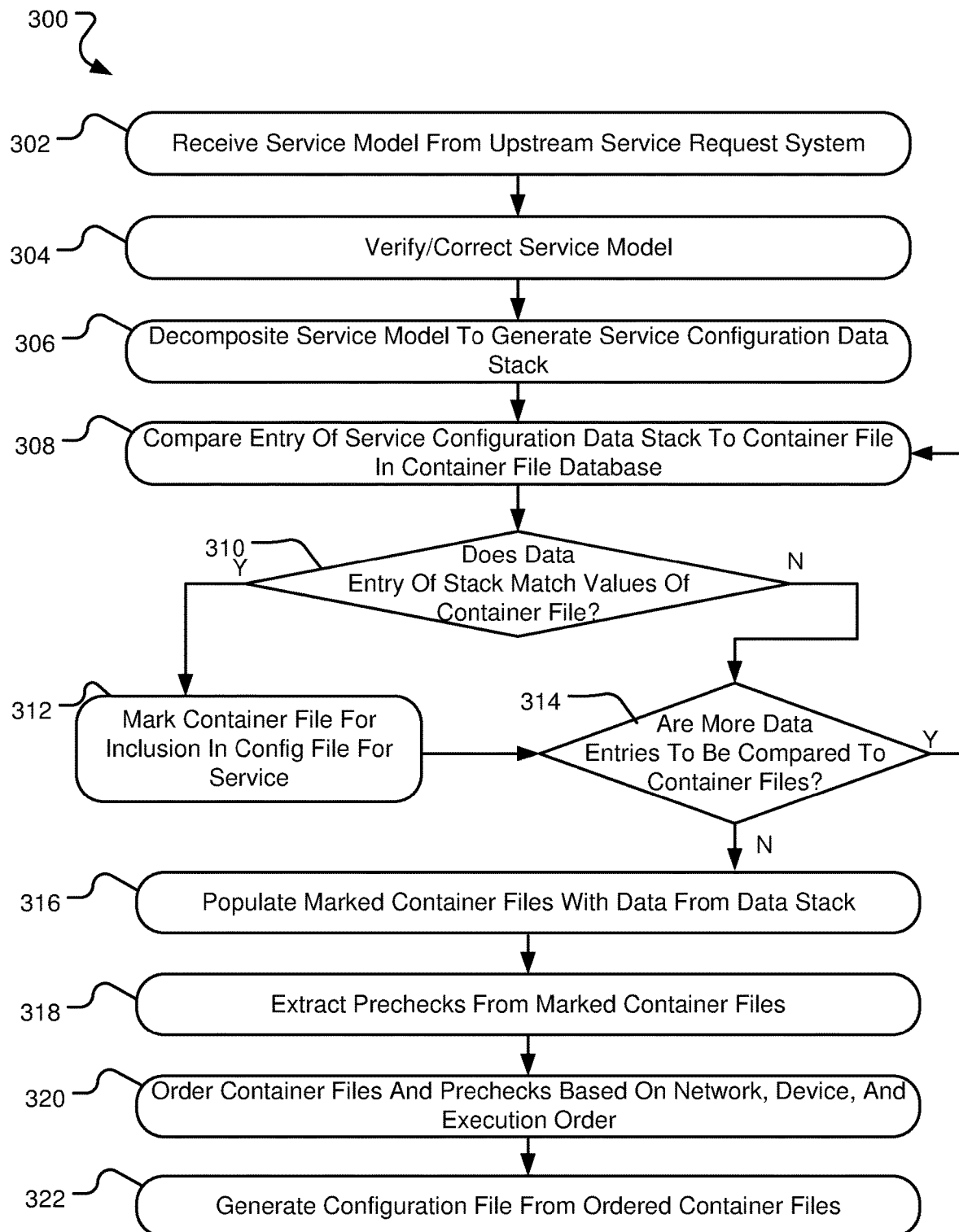
FIG. 3 is a flowchart of a method for building a configuration file with container files based on data obtained from a service request, according to aspects of the present disclosure.

Through the configuration file build process 210, the service activation system 102 may generate a configuration file to be executed on one or more networks to provide a requested service. FIG. 3 is a flowchart of a method 300 for the service activation system 102 to build a configuration file with container files based on data obtained from a service request, according to aspects of the present disclosure. The operations of the method 300 may be performed by one or more components of the service activation system 102, such as those described in the configuration file build process 210 of FIG. 2. Such components may execute the operations through one or more software programs, hardware components, or a combination of hardware and software components.

Beginning in operation 302, the service activation system 102 may receive a service model 204 from an upstream service order request system 106. As described above, the service model 204 may be generated from one or more service order request systems 106 and provided to the service activation system 102 for processing. The service model 204 may include information or data associated with a service request received at the service order request system 106. In operation 304, the service activation system 102 may verify/correct the service model 204. In particular and as described above, the configuration builder 202 of the service activation system 102 may include a model validator 212 to validate the service model 204 provided by the service order request system 106. The configuration builder 202 may also add default values or otherwise alter the service model 204 via one or more model scripts 216, as described above.

In operation 306, the decomposition component 218 of the service activation system 102 may decomposite the service model 204 to generate the service configuration data stack. The decomposition component 218 may obtain values from the service model 204 for inclusion in the data stack of the service model 204. In some instances, the decomposition component 218 of the service activation system 102 may generate one or more of the data stack values based on the information included in the service model 204, as explained above. In operation 308, the service activation system 102 may begin comparing each entry in the data stack generated from the service model 204 to each container file included in the container file database 224. In operation 310, the service activation system 102 determines if the data entry of the data stack matches the values of a container file to indicate that the container file is to be included in a configuration file for the service. As described above, each container file included in the database 224 may be associated with some data or information entry to determine when that container file is selected for a configuration file. For example, a container file may be associated with a "bridge group" service such that, when a bridge group role is included in the data stack from the service order 204, the corresponding container file may be selected for inclusion in a configuration file for the service. Several such container files may be selected for inclusion in the configuration file such that each data entry in the data stack may be compared to the qualifiers of the container files to determine which files are to be selected. If the data entry from the data stack matches the qualifiers for the container file, the file is marked in operation 312 for inclusion in the configuration file for the service. Next, or if the data stack does not match the container file qualifiers, the service activation system 102 may determine, in operation 314, if more comparisons between data entries in the data stack and the container files is needed. If yes, the service activation system 102 may return to operation 308 to continue comparing each entry in the data stack to each container file in the container file database 224.

If the service activation system 102 determines, in operation 314, that all of the data entries in the data stack associated with the service model 204 have been compared to the container files in the database 224, the service activation system 102 may populate the marked container files with data from the data stack. Each container file may include fields in which values from the data stack may be inserted to aid the container file in configuring the network accordingly. For example, the service request may call for instantiating one or more interfaces on network devices. The identification of the network device and/or parameters of the interface may be included in the data stack generated from the service model 204. Further, such information may be needed to configure the network devices to provide the requested interfaces for the service. The information included or imported to the container files may be the same or similar information used to determine if the container file is selected for the configuration file. Thus, the data or information imported to the container files is present in the data stack as the data stack entries are used to select the container files for population. The population of the container files with the data or information from the data stack may generate executable configuration processes on one or more networks for providing the requested service identified in the service model 204.

In operation 318, the service activation system 102 may extract one or more precheck routines from the marked container files. The precheck routines may include service prechecks for which a failure halts the configuration of the service on the network or networks and device prechecks which a failure halts the configuration of the particular device to fail the precheck. Precheck routines may form a portion of the container files and may be related to the configuration being conducted based on the instructions of the container file. For example, a container file for generating an interface on a network device may include a precheck to determine that the interface is not already configured on the device or that the planned interface interferes with an existing interface. Prechecks may also determine if the planned affected network devices are present and active in the network. In general, the service and/or device prechecks may include any check of the network configuration and/or operation to ensure that configuration of the network is allowed or advised. The extracted precheck routines may be included in a list along with the marked container files for organization into a configuration file for providing the requested service.

In operation 320, the service activation system 102 may order container files and the prechecks based on aspects of the service model 204. For example, the service activation system 102 may determine that the service prechecks should be performed prior to any configuration of network devices to ensure that instantiating the service on the network will not negatively impact other operations of the network. In another example, the container files may be organized based on a sequence of execution on one or more networks to provide the service. For example, a VPN service may include configuring network devices with particular VPN interfaces before establishing a connection between the devices. In still another example, the service may be instantiated on more than one network with dependencies between the networks. Therefore, the order in which the container files are applied to the networks may be dependent on the dependencies between the networks or devices and the container files may be ordered accordingly. In general, the service activation system 102 may utilize many considerations of the network configurations for ordering the container files and prechecks. In operation 322, the service activation system 102 generates a configuration file for the requested service based on the ordered container file. The generation of the configuration file may include combining the container files in the determined order such that the container files comprise the configuration instructions included in the configuration file.

Figure 4:
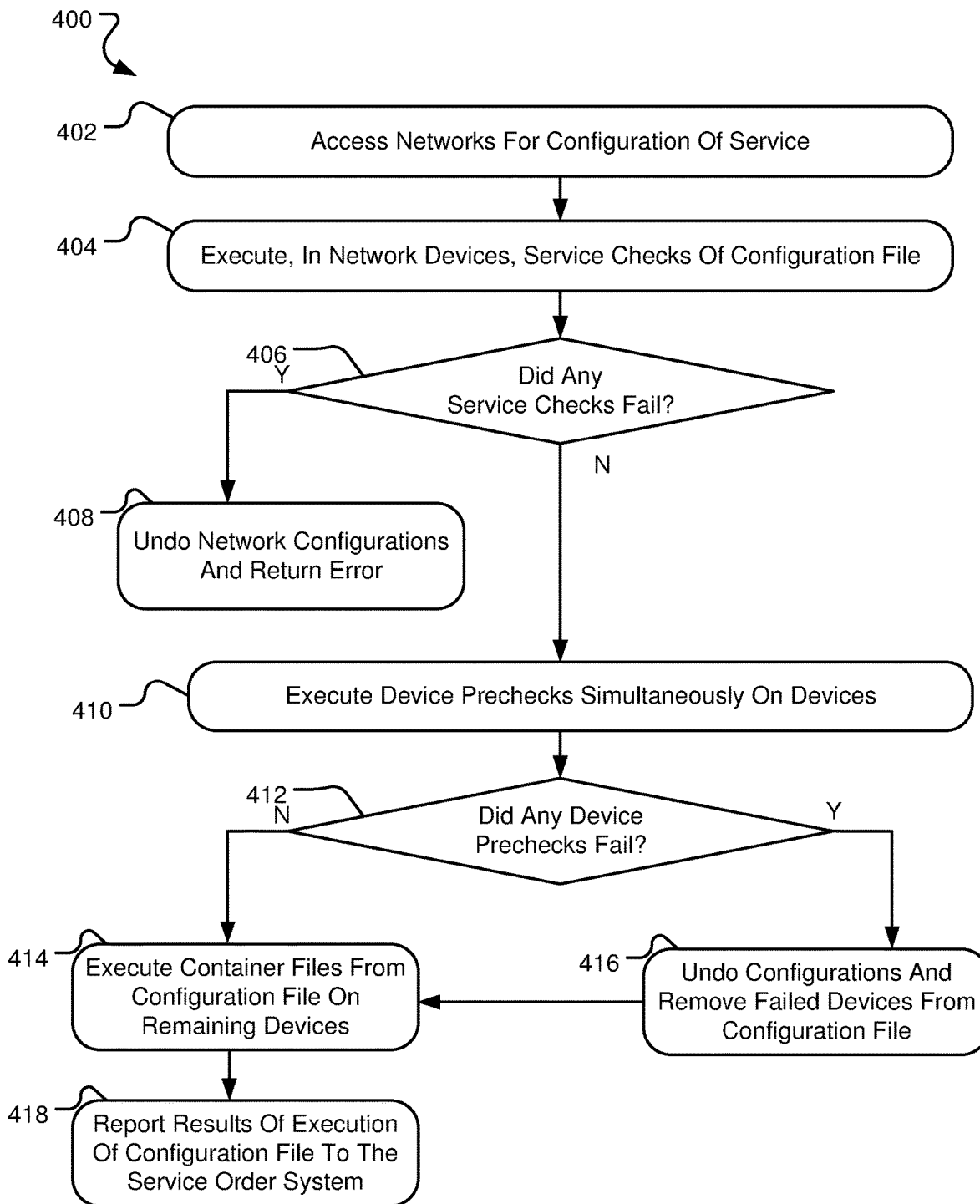
FIG. 4 is a flowchart of a method for executing a configuration file on one or more network devices to provide a network service, according to aspects of the present disclosure.

With the configuration file generated, the service activation system 102 may execute the configuration file on one or more networks to instantiate the requested service. FIG. 4 is a flowchart of a method 400 for executing a configuration file on one or more network devices to provide a network service, according to aspects of the present disclosure. The operations of the method 400 may be performed by the service activation system 102 described above. In particular, the NSO 110 portion of the service activation system 102 may perform the operations of the method 400 to configure one or more network devices 120A,120B according to the configuration file built from the service order. In other instances, the NSO 110 (or similar system) may be separate from the service activation system 102 such that the system 102 may provide the generated configuration file to the NSO 110 for execution on the network devices 120A,120B. The service activation system 102 and/or the NSO 110 may execute the operations through one or more software programs, hardware components, or a combination of hardware and software components.

Figure 5:
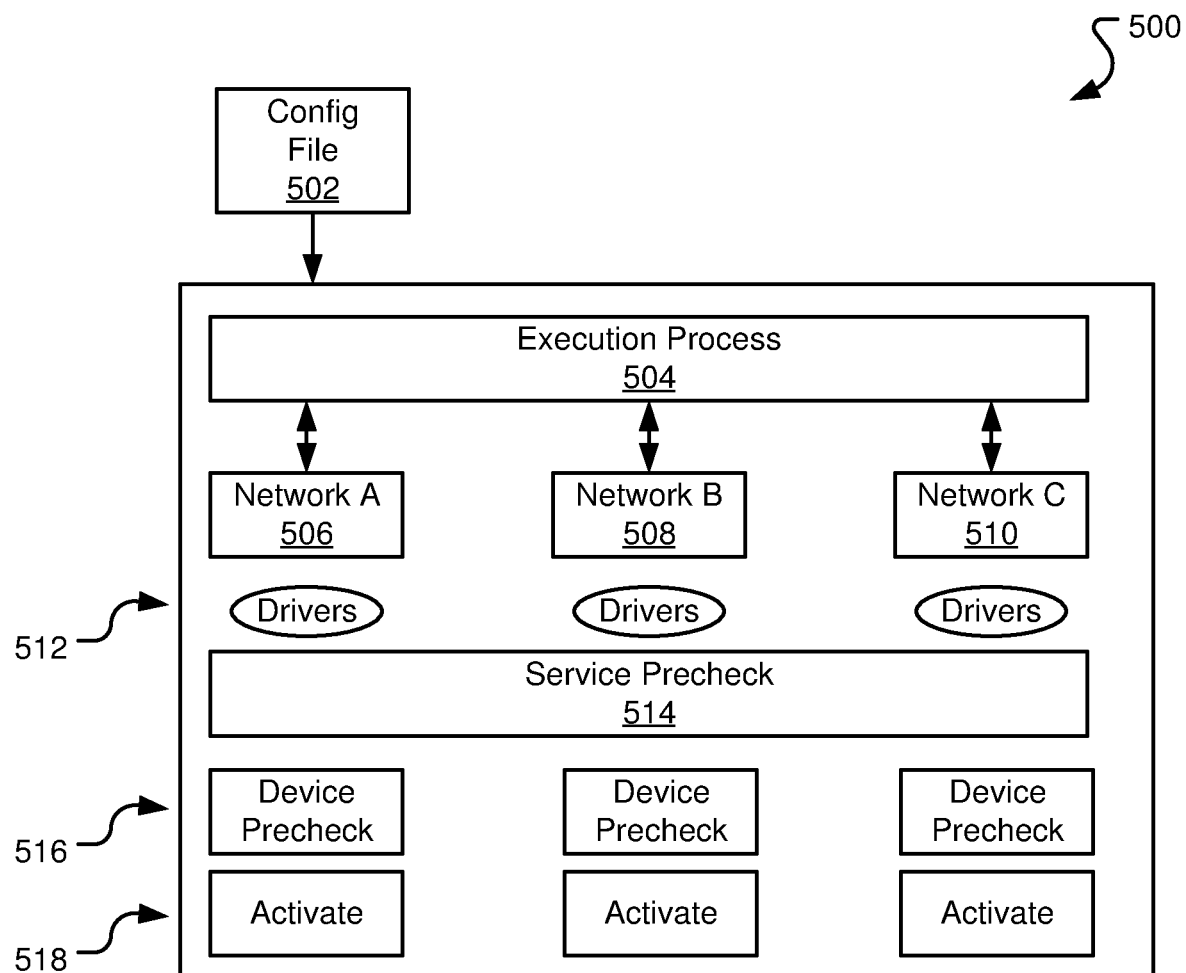
FIG. 5 illustrates an exemplary block diagram of a configuration execution system of the service activation system of the network, according to aspects of the present disclosure.

Beginning in operation 402, the service activation system 102 may access one or more networks for which the requested service is to be instantiated. The networks for providing the service may be identified via the configuration file provided by the service activation system. For example, FIG. 5 illustrates an exemplary block diagram 500 of a configuration execution system of the service activation system 102, according to aspects of the present disclosure. As shown, the configuration file 502 generated from the service activation system 102 may be provided during an execution process 504 (such as to a NSO 110 portion of the service activation system 102). The execution process 504 may include determining the various networks associated with the configuration file 502. For example, different networks may be configured to provide portions or aspects of a service. Network A 506 may, for example, provide a connection to a customer device while network B 508 may provide for a conferencing bridge connection for the customer. For some services, therefore, configuration of devices in multiple networks may be included in the instantiation to provide the service to the customer. In some instances, network A 506 may include a customer network, network B 508 may include a backbone or core network, and network C 510 may include a peer network connected to the core network. In any manner, more than one network 506-510 may include network devices for configuration to provide a requested service based on the service model 402. As such, in operation 402, the service activation system 102 may determine the networks identified in the configuration file 502 and request access to the affected networks 506-510. In some instances, the service activation system 102 may execute or utilize one or more network drivers 512 to access devices of the network. As explained in more detail below, the service activation system 102 utilizes one or more drivers 512 to communicate with network devices of the respective networks 506-510 to obtain device information and/or configure the devices according to the configuration file 502.

In operation 404, the service activation system 102 executes one or more service checks 514 of the configuration file 502 to determine if instantiation of the service should continue. As described above, service checks may be included in the container files included in the configuration file 502 and extracted for ordering within the configuration file. In general, services checks are performed before configuration of network devices to provide the requested service. As such, the service activation system 102 may utilize one or more of the network drivers 512 to perform service prechecks 514 on the networks. In general, the service precheck 514 accesses network devices, via the drivers 512, to obtain network data or configuration information and determines if the instantiation of the service on the networks 506-510 disrupts other services or operations of the network. For example, the configuration file 502 may include an instruction to open an interface on a particular network device of network A 506. However, the target network device may be decommissioned or otherwise unavailable for the interface. In another example, the configuration file 502 may include an instruction to use a port of a device that is already in use by another service. Thus, service prechecks 514 may cause the service activation system 102 to access the target network devices identified in the configuration file 502 to determine available connections, interfaces, ports, devices, etc. and/or the impact of providing the service on the operations of the networks 506-510.

In one instance of the service activation system 102, an ordered list of possible drivers 512 for communicating with network devices to obtain the device information or data may be used by the service activation system 102. For example, the service activation system 102 may attempt to communicate with a network device using a first driver (such as a Secure Shell (SSH) communication protocol) to obtain the device information. If the device does not support SSH communications or is otherwise unresponsive to the first drive, the service activation system 102 may utilize a second driver (such as a Telnet communication protocol), and so on. Thus, the service activation system 102 may utilize more than one driver 512 to perform the service prechecks 514 on the network device.

In operation 406, the service activation system 102 may determine if one or more of the service prechecks 514 failed. If yes, the system 102 may undo any configurations of the networks 506-510 that may have been completed from the configuration file 506 and return an error in operation 408. The error may be provided to the service order system 106 in response to the failed service precheck to indicate to the service order system 106 that the service is not to be instantiated on the networks 506-510. The service order system 106 may then request an alteration to the service order from the customer device 122A or other source of the service order. Therefore, the service activation system 102 may not instantiate the service if the service precheck is failed.

When the service precheck is allowed, the service activation system 102 may execute one or more device prechecks 516 on the network devices included in the configuration file 502. The device prechecks 516 may be executed in a similar manner as the system prechecks 514 in that the service activation system 102 may, in response to the ordered configuration file 502, access one or more identified network devices of networks 506-510 using one or more network drivers 512 to obtain information or data associated with the configuration of the device. In some instances, information provided by the network device in response to a device precheck may cause the service activation system 102 to perform an additional device precheck. The order and logic for executing device prechecks 516 may be included in the container files of configuration file 502, as explained above. Further, the device prechecks 516 may be executed on the network devices simultaneously by the service activation system 102 to reduce the time for conducting the prechecks. As such, the service activation system 102 may communicate with each of the network devices identified in the configuration file 502 to perform the device prechecks 516.

In operation 412, the service activation system 102 may determine if any of the device service checks failed based on the information returned from the network devices. If each device prechecks passes without a failure, the service activation system 102 may execute or activate 518 the container files included in the configuration file 502 in the order indicated in the configuration file. Execution of the container files may include transmitting, using the network drivers 512, one or more configuration instructions to the identified network devices to configure the devices according to the container files included in the configuration file 502. Similar to the device prechecks, the instructions for configuring the network devices may be transmitted or executed simultaneously on the network devices to configure the devices accordingly. In this manner, the configuration file 502 may be executed to configure one or more of the network devices to provide the requested service for which the configuration file 502 is based.

Returning to operation 412, the service activation system 102 may determine that one or more device prechecks of the configuration file 504 fails. Upon a device precheck failure, the service activation system 102 may undo, in operation 416, configurations executed on the failed network device associated with the configuration file 502 and remove the failed device from the configuration file 502. In this manner, the network device that fails the device precheck may not be included in the configuration of the service on the networks 506-510, although other network devices that do not fail the device precheck may be configured to instantiate the service in the networks 506-510. The service activation system 102 may then proceed to operation 414 described above to execute the remaining container files of the configuration file 502 on the network devices. In operation 418, the results of the configuration of the networks 506-510 in response to the configuration file 502 may be reported to the service order system 106. The service order system 106 may, in response to the report, provide an update to the customer computing device 122A, generate an updated service order model to correct one or more failures of the configuration file 504, and/or generate a new service order model to provide to request additional services from the networks 506-510. In this manner, the configuration file 502 from the configuration builder 202 of the service activation system 102 may be implemented on one or more networks 506-510 to provide the requested service received at the service order system 106.

Figure 6:
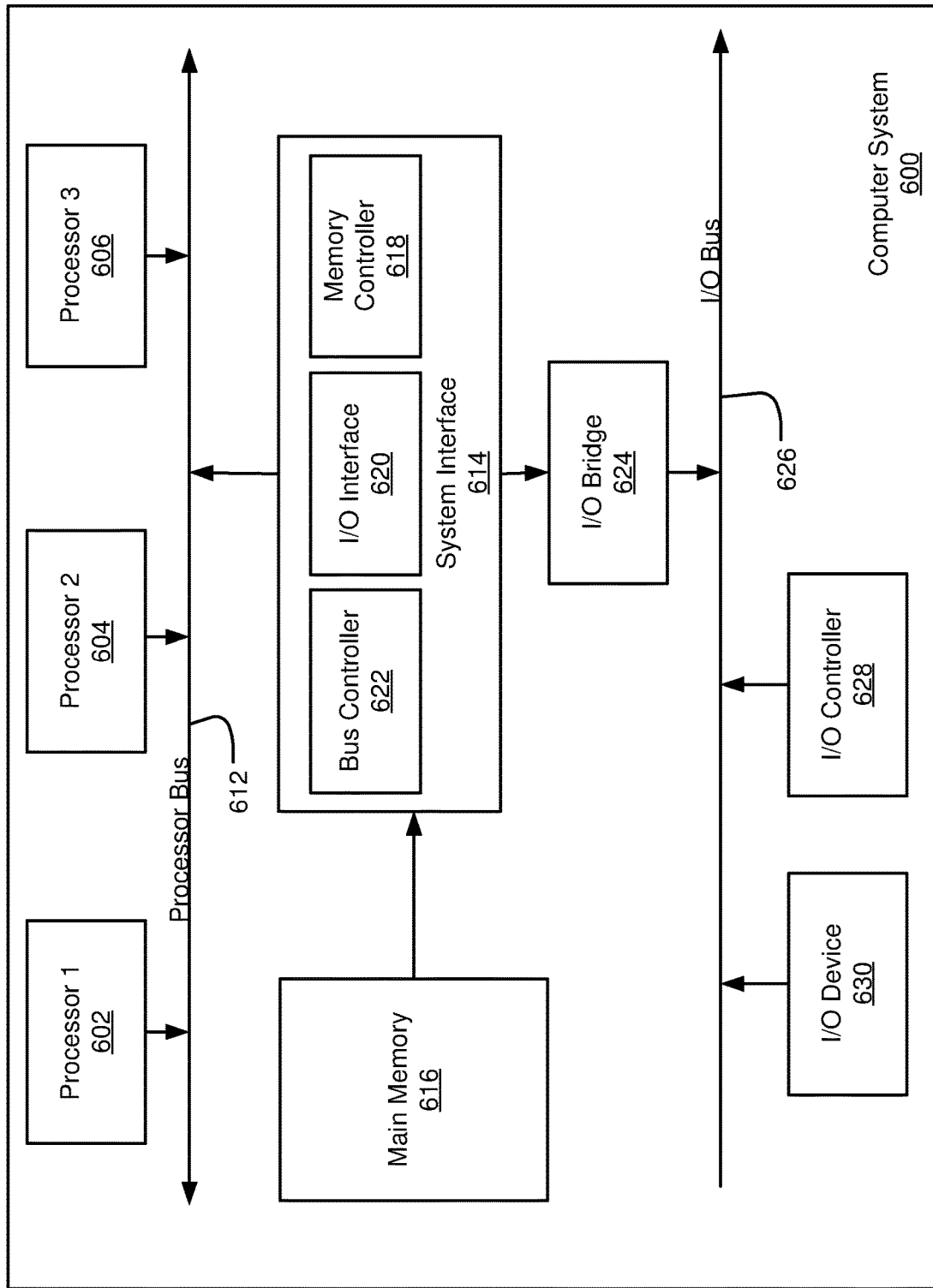
FIG. 6 illustrates an example of a computing system that may implement various services, systems, and methods discussed herein.

FIG. 6 is a block diagram illustrating an example of a computing device or computer system 600 which may be used in implementing the embodiments of the components of the network disclosed above. For example, the computing system 600 of FIG. 6 may be the service activation system discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for provisioning a network service, comprising:
    accessing, utilizing a processor of a network service activation system, a service request model associated with a network service, the request model including information associated with the network service;
    generating, based on the information of the service request model, a data stack associated with the network service, the data stack comprising data extracted from the service request model;
    selecting, based on the data stack, a plurality of container files comprising configuration instructions for configuring a network device to provide the network service; and
    causing the execution of the configuration instructions on the network device to configure the network device according to the container files to provide the network service, wherein
    selecting the plurality of container files comprises comparing each entry in the data stack to the data field of each stored container file, wherein each of the plurality of container files comprise a data field matching at least one entry in the data stack.

2. The method of claim 1 further comprising:
    validating the service request model using a rule comparing the information associated with the network service to an expected information structure.

3. The method of claim 1, wherein the container files further comprises a service precheck routine configured to verify an operational status of a network and a network device precheck routine configured to verify an operational state of the network device.

4. The method of claim 3 further comprising:
    extracting the service precheck routine and the network device precheck routine from the container files; and
    generating a configuration file comprising the service precheck routine, the device precheck routine, and the container files.

5. The method of claim 4 further comprising:
    ordering the configuration file to include the service precheck routine before the device precheck routine, the configuration file applied to the network device in the established order.

6. The method of claim 1, wherein the plurality of container files are stored in a database of container files, each of the stored container files further comprising a data field corresponding to a possible portion of the data stack associated with the network service.

7. The method of claim 1, wherein generating the data stack associated with the network service comprises:
    extracting data from a field of the request model; and
    generating, based on the extracted data, an entry of the data stack.

8. The method of claim 1, wherein selecting the plurality of container files comprises:
    comparing a plurality of entries in the data stack to the plurality of container files, each container file further comprising a data field; and
    selecting a container file of the plurality of container files if an entry of the plurality of entries matches the data field for the container file.

9. A system for provisioning a network service, comprising:
    at least one communication port for receiving, from an order entry system, a service request model associated with a network connection design to provide an intended network service to a user of a telecommunications network;
    a processing device; and
    a computer-readable medium connected to the processing device configured to store instructions that, when executed by the processing device, performs the operations of:
        generating, based on information included in the service request model, a data stack comprising one or more portions of the information in the service request model;
        applying a network configuration template for configuring a network to provide the network service, the network configuration template comprising a plurality of ordered generic container files selected for the network configuration template based on the data stack, wherein one or more of the generic container files comprise a network service precheck routine, a network device precheck routine, and a plurality of configuration instructions populated from the data stack for configuring a network device; and
        selecting the plurality of ordered generic container files comprises from the database, wherein selecting the plurality of ordered generic container files comprises comparing each entry in the data stack to the data field of each of the stored container files, wherein each of the plurality of ordered generic container files comprise a data field matching at least one entry in the data stack.

10. The system of claim 9, wherein the instructions further cause the processing device to perform the operation of:
validating the service request model using a rule comparing the information associated with the intended network service to an expected information structure.

11. The system of claim 9, wherein the network service precheck routine of the generic container files verifies an operational status of a network and the network device precheck routine verifies an operational state of the network device.

12. The system of claim 9, wherein the instructions further cause the processing device to perform the operation of:
ordering the network configuration template to include the network service precheck routine before the network device precheck routine, the network configuration template applied to the network device in the established order.

13. The system of claim 9, further comprising:
a database of stored container files, each of the stored container files further comprising a data field corresponding to a possible portion of the data stack associated with the intended network service.

14. The system of claim 13, wherein the instructions further cause the processing device to perform the operations of:
extracting data from a field of the service request model; and
generating, based on the extracted data, an entry of the data stack.

15. The system of claim 13, wherein the instructions further cause the processing device to perform the operations of:
comparing a plurality of entries in the data stack to the plurality of ordered generic container files, each container file further comprising a data field; and
selecting a container file of the plurality of ordered generic container files if an entry of the plurality of entries matches the data field for the container file.

16. A networking device for activating services on a telecommunications network, the networking device comprising:
a processing device; and
a computer-readable medium connected to the processing device configured to store instructions that, when executed by the processing device, performs the operations of:
obtaining a service request model associated with a network service, the request model including information associated with the network service;
extracting information of the service request model to generate a data stack associated with the network service, the data stack comprising the extracted information;
selecting, based on the data stack, a plurality of container files comprising configuration instructions for configuring a network device to provide the network service, wherein selecting the plurality of container files comprises comparing each entry in the data stack to the data field of each stored container file, wherein each of the plurality of container files comprise a data field matching at least one entry in the data stack; and
communicating with the network device to configure the network device according to the container files to provide the network service.

17. The networking device of claim 16, wherein the processor further performs the operation of:
validating the service request model using a rule comparing the information associated with the network service to an expected information structure.

18. The networking device of claim 16, wherein at least one of the container files comprises a service precheck routine configured to verify an operational status of a network and a network device precheck routine configured to verify an operational state of the network device.

* * * * *